(No Model.) 3 Sheets—Sheet 1.
B. L. TOQUET.
PULLEY.
No. 496,328. Patented Apr. 25, 1893.
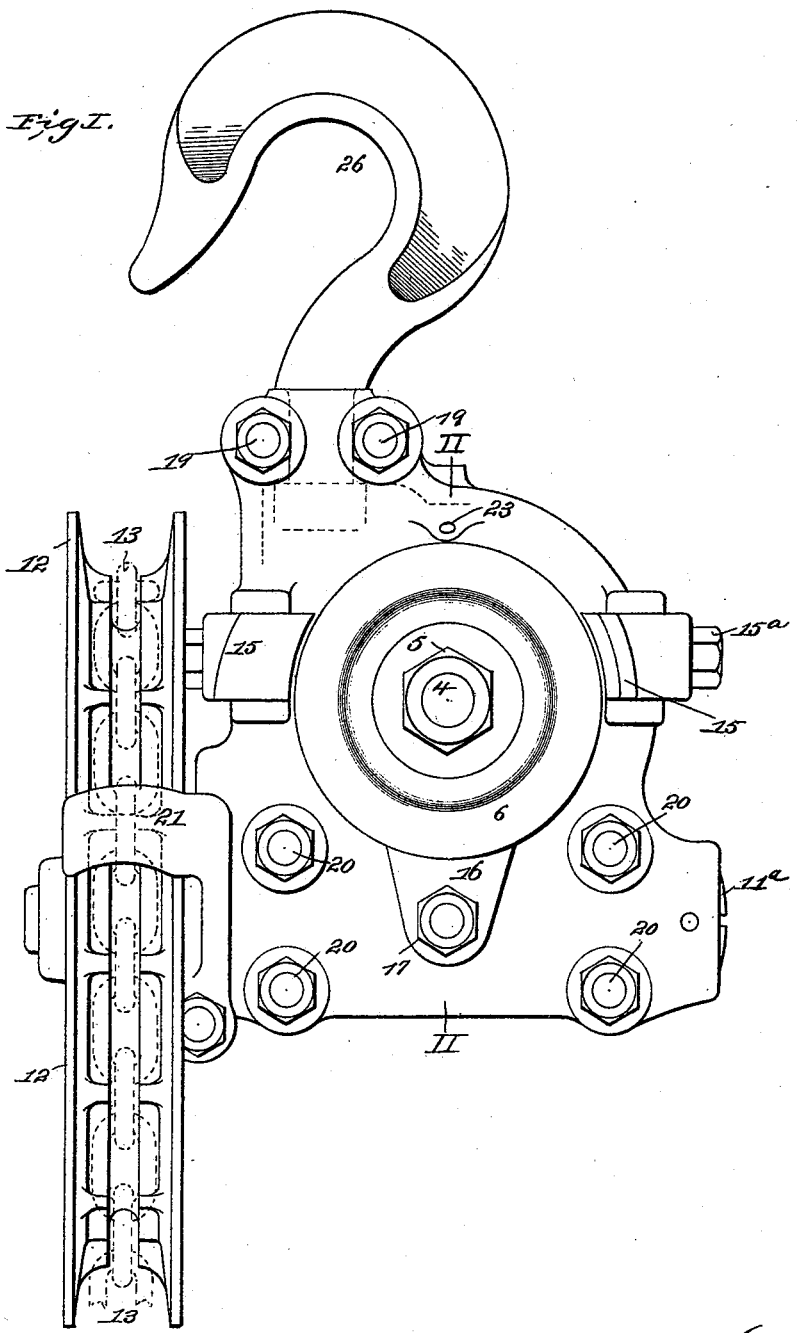
Fig. I.
Witnesses:
Harry S. Rohrer
George E. Cruse
Inventor
Benjamin L. Toquet.
By Knight Bros
Attorneys.
THE NORRIS PETERS CO., PHOTO-LITHO., WASHINGTON, D. C.

(No Model.)
B. L. TOQUET.
PULLEY.
No. 496,328. Patented Apr. 25, 1893.
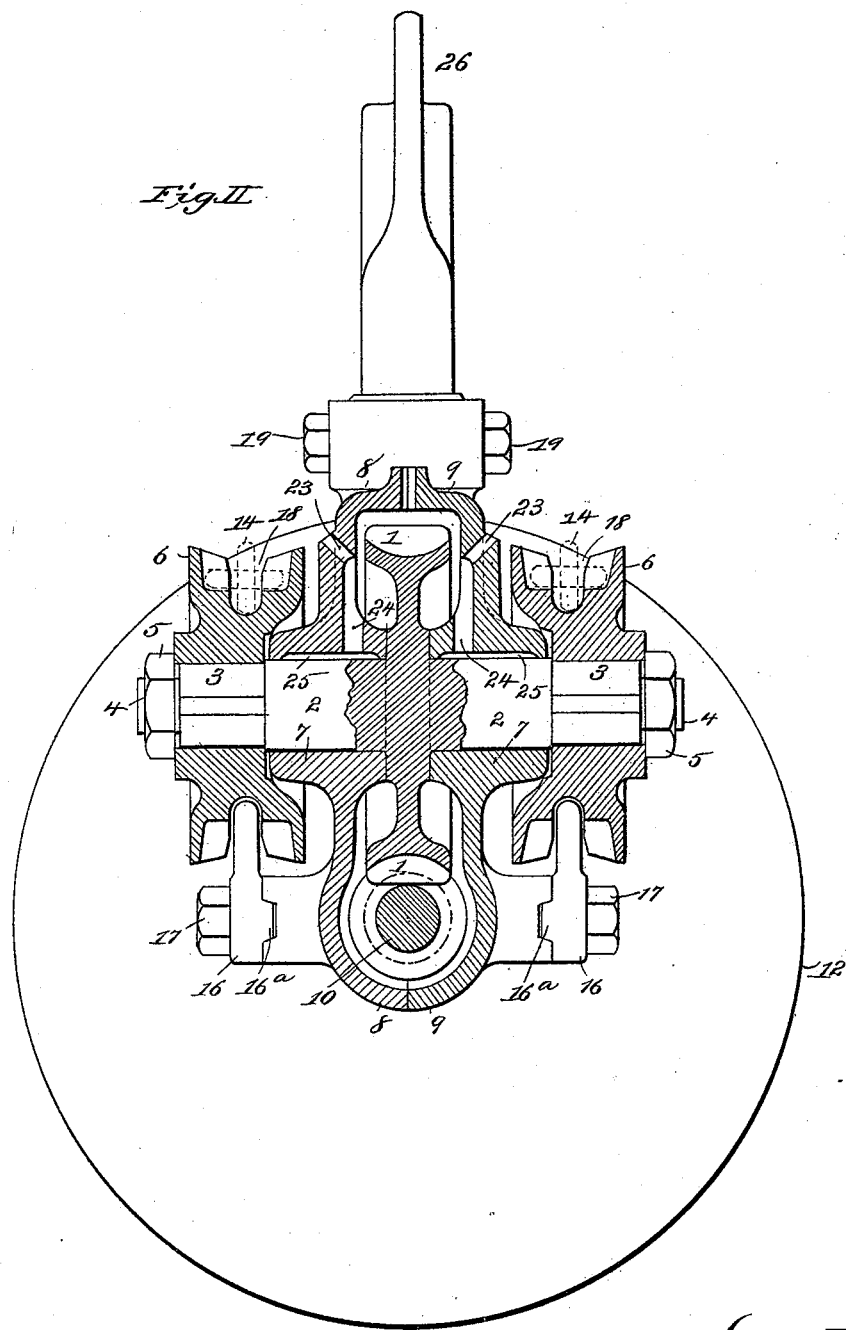

(No Model.) 3 Sheets—Sheet 3.
B. L. TOQUET.
PULLEY.
No. 496,328. Patented Apr. 25, 1893.
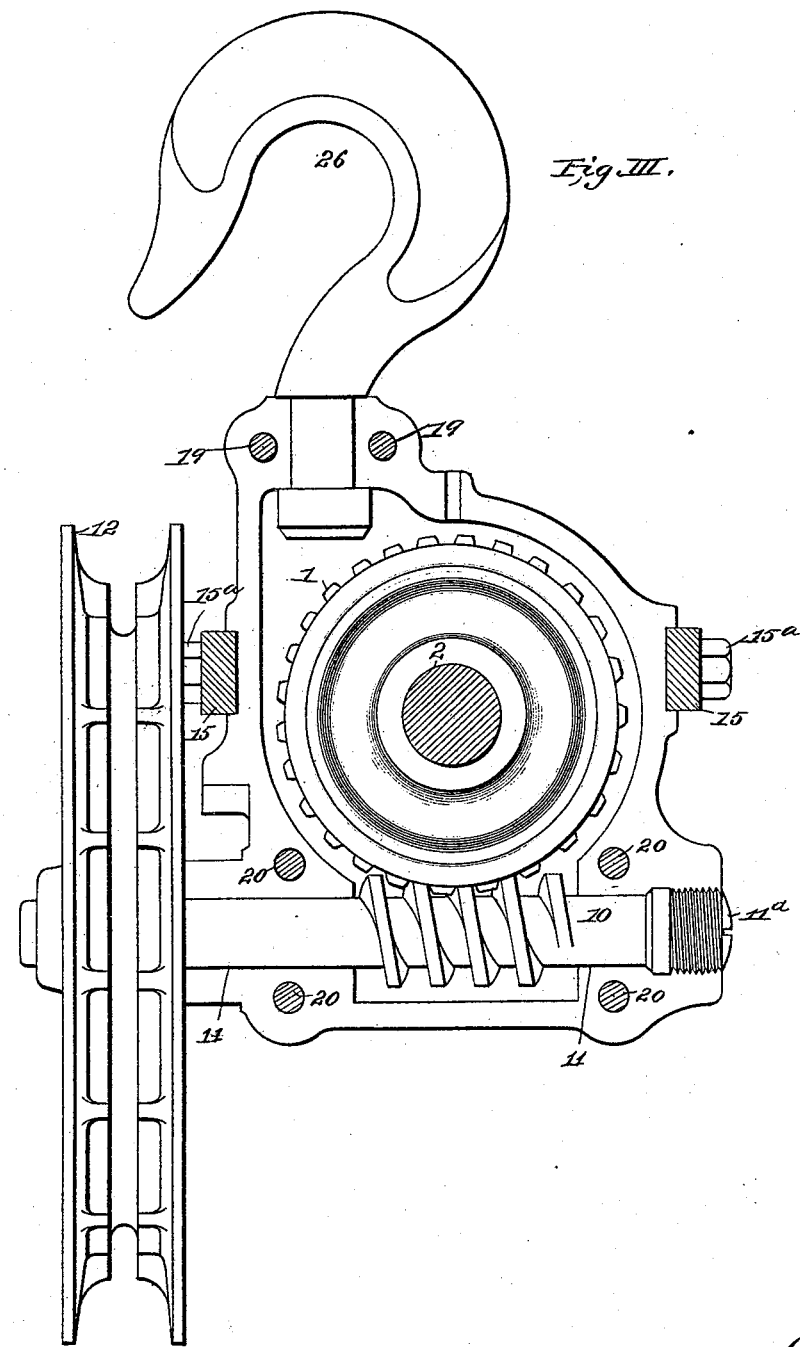
Fig. III.
Witnesses:
Harry D. Rohrer.
George E. Cruse.
Inventor
Benjamin L. Toquet
By Knight Bros.
Attorneys.

UNITED STATES PATENT OFFICE.

BENJAMIN L. TOQUET, OF WESTPORT, ASSIGNOR TO THE YALE & TOWNE MANUFACTURING COMPANY, OF STAMFORD, CONNECTICUT.

PULLEY.

SPECIFICATION forming part of Letters Patent No. 496,328, dated April 25, 1893.

Application filed August 24, 1892. Serial No. 443,986. (No model.)

*To all whom it may concern:*

Be it known that I, BENJAMIN L. TOQUET, a citizen of the United States, residing at Westport, in the county of Fairfield and State of Connecticut, have invented certain new and useful Improvements in Worm-Wheel or Screw-Pulley Blocks, of which the following is a specification.

My invention relates to improvements in portable pulley blocks or hoisting apparatus of the class or kind consisting essentially of a screw shaft rotated by a chain-wheel or other suitable means, a worm wheel rotated by the screw and chain pinions driven by the worm-wheel and carrying the hoisting chains. This apparatus may be used as a portable hoist suspended from a beam by means of a trolley adapting it to be moved from place to place or provided with a hood for its suspension at any desirable point.

My invention relates to improvements hereinafter particularly described and claimed by which a power pulley-block of this class may be made with less weight, and at reduced cost and will have greater power and endurance than portable hoisting blocks of this general description now in common use.

In the accompanying drawings:—Figure I is a side view of a screw pulley block illustrating my invention. Fig. II is a vertical section of the same on the line 2—2 of Fig. I. Fig. III is a side elevation with one half of the casing removed, showing the casing connections and the worm-wheel gudgeon in section.

My improved screw pulley block is constructed with a worm wheel 1, formed with integral gudgeons 2, 2, and ends 3, 3, on which the load-chain pinions 6, 6, are keyed; and terminating in screw pins 4, 4, for the reception of nuts 5, 5, by which the said chain pinions 6 are secured upon the ends 3 of the shaft thus formed. The worm-wheel 1, is excavated as shown in Fig. II on its opposite faces so as to afford long bearings 7, 7, for the gudgeons 2, 2, and bring the said bearings as near as possible to the center. The gudgeon bearings 7, 7 are formed in the respective members 8, 9, of a two part box or casing in which the worm-wheel 1 and the transverse worm shaft 10 which drives the same are inclosed. The worm shaft 10 has its bearings in a box 11 in the lower part of the casing closed at one end by a screw plug 11ª which serves as a bearing to take up the end thrust of the driving-screw 10. On the projecting end of the worm shaft 10 the power wheel 12 is keyed. This power wheel 12 is formed with the customary grooved periphery for the reception of a hand chain or rope 13 as preferred, by which it is rotated. The load-chain-pinions 6 are excavated on their inner faces to receive the cheeks of the box or casing in which the bearings 7 are contained in order to reduce the length of the apparatus and the distance of the hoisting chains 14 from the center.

15 represents load chain guides secured to the casing by bolts 15ª.

At the lower part of the casing on each side, are vertical chain strippers 16, formed with squared lugs 16ª which fit corresponding sockets prepared for them in the sides of the casing to prevent them from turning. The said chain strippers are secured in position by tap bolts 17, and project upward into circumferential grooves 18 formed in the peripheries of the chain pinions 6.

By constructing my worm-wheel 1 with solid integral gudgeons 2, 2, and dispensing with the use of an axial bolt extending completely through the wheel, I am enabled to make the gudgeons of smaller diameter, thus reducing friction and increasing the efficiency of the apparatus. The lightness, compactness and efficiency of the block are also materially enhanced by bringing the worm-wheel down to a web near its center as already described.

Another advantage in my mode of constructing the worm wheel 1 and its shaft and gudgeon 2, 3, 4, in one piece and the chain pinions 6, 6, separately is that it permits the worm wheel and its shaft to be made of bronze while the chain pinions 6, 6, and the casing 8, 9, are made of iron or steel.

The two parts 8, 9, of the casing are secured together by bolts 19, 20.

21 represents a guide plate for the chain or rope on the power wheel secured to the casing by a bolt 22.

Apertures and channels for oil are shown at 23, 24, 25.

The pulley-block thus constructed is suspended from any desired point by a hook 26 having a neck fitting in a socket in the upper part of the casing and terminating in a head or collar 26ª which engages with shoulders beneath said socket as indicated by dotted lines in Fig. I. If preferred the casing may be provided with the customary trolley for shifting it along a supporting beam or track. The suspension device of whatever kind is located as here shown in the common vertical plane of the hoisting chains 14.

Having thus described my invention, the following is what I claim as new and desire to secure by Letters Patent—

1. The combination of the worm-wheel 1 having gudgeons 2, 2, pinion-seats 3, 3, and screw-ends 4, 4, formed integrally therewith, the two-part supporting casing 8, 9, having apertures through which the ends of the worm-wheel-shaft project and bearings 7, 7, for the gudgeons 2, 2, extending inward to the central web of the worm-wheel, the load-chain-pinions 6, 6, secured on the projecting ends of the worm-wheel-shaft, and the driving-screw 10 journaled in the lower part of the casing, all substantially as herein shown and described.

2. The combination of the worm-wheel 1, having a solid shaft consisting of journals 2, 2, pinion-seats 3, 3, and projecting threaded ends 4, 4, formed integrally with said worm-wheel; the two part supporting casing 8, 9, divided on the central plane of the worm-wheel, fitting tightly over the shaft journals 2, 2, and formed with bearings 7, 7, therefor; the driving screw 10 inclosed and journaled in the lower part of the divided casing; and the plug 11 screwed into the casing and forming a solid bearing to receive the end thrust of the driving screw as explained.

BENJAMIN L. TOQUET.

Witnesses:
SCHUYLER MERRITT,
GEO. E. WHITE.